(12) United States Patent
Fujimaki et al.

(10) Patent No.: US 10,776,677 B2
(45) Date of Patent: Sep. 15, 2020

(54) CONTROL DEVICE AND INSPECTION DEVICE

(71) Applicant: TAIYO ELECTRIC INDUSTRY CO., LTD., Tokyo (JP)

(72) Inventors: Katsuhiko Fujimaki, Tokyo (JP); Kazuki Kawata, Tokyo (JP)

(73) Assignee: TAIYO ELECTRIC INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/567,151

(22) Filed: Sep. 11, 2019

(65) Prior Publication Data

US 2020/0005104 A1    Jan. 2, 2020

Related U.S. Application Data

(63) Continuation of application No. PCT/JP2017/009930, filed on Mar. 13, 2017.

(51) Int. Cl.
*G06K 15/00* (2006.01)
*G06K 15/02* (2006.01)
(Continued)

(52) U.S. Cl.
CPC ............ *G06K 15/408* (2013.01); *B41F 33/16* (2013.01); *G06K 15/022* (2013.01);
(Continued)

(58) Field of Classification Search
CPC ......... H04N 1/506; H04N 2201/04787; H04N 1/00002; H04N 1/00045; H04N 1/00082;
(Continued)

(56) References Cited

U.S. PATENT DOCUMENTS 5,974,967 A * 11/1999 Bravenec ................ B41F 13/14
                                                              101/183
10,386,775 B2 * 8/2019 Geshi ..................... B65H 9/006
(Continued)

FOREIGN PATENT DOCUMENTS

JP          H1199634 A      4/1999
JP         2007243666 A     9/2007
(Continued)

*Primary Examiner* — Negussie Worku
(74) *Attorney, Agent, or Firm* — Muncy, Geissler, Olds & Lowe, P.C.

(57) ABSTRACT

In a control device which controls a printing press, a capturing unit captures an inspection target object printed on a target printed material by the printing press, and outputs RGB values of each pixel of a captured image. The converter specifies a pixel with respectively equal RGB values and a pixel with respectively approximating RGB values as pixels in the grayscale area in the image, and converts the RGB values of each pixel other than the grayscale area into HSV values. An extractor extracts a pixel of an extraction target color from the image based on the RGB values in a case of the pixel in the grayscale area, and the HSV values in a case of the pixel other than the grayscale area. The controller controls the printing press to correct the print misalignment based on the pixels of the extraction target color extracted by the extractor.

8 Claims, 9 Drawing Sheets

(51) Int. Cl.
*B41F 33/16* (2006.01)
*G06T 7/00* (2017.01)

(52) U.S. Cl.
CPC .. *G06T 7/0004* (2013.01); *G06T 2207/10024* (2013.01); *G06T 2207/30144* (2013.01)

(58) Field of Classification Search
CPC .. H04N 1/0402; H04N 1/0405; H04N 1/0443; H04N 2201/04722; H04N 2201/04751; G03G 2215/0161; G03G 15/5058; G03G 15/01; G03G 2215/0119; G03G 15/0189; G03G 15/043; G03G 2215/0132; B41J 29/393; B41J 2/2135; B41J 19/145; B41J 2/2132; B41J 11/008; B41J 11/06; B41J 13/0009; B41J 2202/20; B41J 2/15; B41J 2/525; G02B 26/127; G02B 27/0031; G02B 27/0068; G02B 7/023; G06K 15/00; G06K 15/027; G06K 15/1822; B41F 33/00; G06T 1/00
USPC .......................... 358/448, 474, 502
See application file for complete search history.

(56) References Cited

U.S. PATENT DOCUMENTS

| | | | |
|---|---|---|---|
| 2004/0163562 A1 | 8/2004 | Lewis, Jr. et al. | |
| 2006/0226338 A1* | 10/2006 | Tojima | H04N 1/506 250/208.1 |
| 2008/0100658 A1* | 5/2008 | Bastani | B41J 29/393 347/16 |
| 2008/0174834 A1* | 7/2008 | Ueda | G03G 15/01 358/488 |
| 2009/0021543 A1* | 1/2009 | Baba | B41J 29/393 347/9 |
| 2009/0231605 A1* | 9/2009 | Kuwahara | B41J 29/393 358/1.9 |
| 2009/0231623 A1* | 9/2009 | Kuwahara | B41J 29/393 358/1.15 |
| 2010/0124362 A1* | 5/2010 | Wu | G03G 15/0163 382/112 |
| 2010/0156980 A1* | 6/2010 | Azuma | B41J 2/2146 347/14 |
| 2014/0169842 A1* | 6/2014 | Nakashima | G03G 15/0189 399/301 |
| 2015/0212449 A1* | 7/2015 | Yokoi | G03G 15/043 347/118 |
| 2015/0343809 A1* | 12/2015 | Aoki | B41J 13/0009 347/14 |
| 2015/0362809 A1* | 12/2015 | Wang | H01L 27/1255 257/532 |
| 2018/0278905 A1* | 9/2018 | Nakazawa | H04N 9/3194 |
| 2019/0054734 A1* | 2/2019 | Baran | B41F 5/24 |
| 2019/0118550 A1* | 4/2019 | Furuta | B41J 2/2135 |
| 2019/0152215 A1* | 5/2019 | Fujimaki | B41F 13/025 |
| 2019/0206033 A1* | 7/2019 | Wu | G06K 9/00228 |

FOREIGN PATENT DOCUMENTS

| | | |
|---|---|---|
| JP | 2012249133 A | 12/2012 |
| JP | 2013120550 A | 6/2013 |
| JP | 2016196091 A | 11/2016 |
| JP | 6030732 B1 | 3/2017 |

* cited by examiner

CONTROL DEVICE AND INSPECTION DEVICE

CROSS-REFERENCE TO RELATED APPLICATIONS

This application is a Continuation of International Application No. PCT/JP2017/009930, filed on Mar. 13, 2017, the disclosures of which Application are incorporated by reference herein.

BACKGROUND

1. Field of the Disclosure

The present disclosure relates to a control device and an inspection device which perform processing based on a captured image.

2. Description of the Related Art

When a rotary printing press prints a pattern of multiple colors on a web, the colors are generally overlaid one by one and printed to form one pattern. In this case, when each color is overlaid, a print misalignment may occur, and therefore it is necessary to perform accurate alignment so as not to cause misregister. To achieve this object, a control device which is referred to as an automatic registering device is used. This automatic registering device generally includes a register error detection device which detects a register error based on a register mark printed per color on a web, and controls compensator rollers or plate cylinders of the rotary printing press to correct misregister.

It is assumed that the register error detection device captures register marks of two colors by a color camera, extracts the register marks of the two colors from a captured image, and detects a register error based on a positional relationship between the extracted register marks of the two colors.

Furthermore, in addition to the rotary printing press, there is used a control device which captures predetermined marks printed on a printed material by a color camera, extracts the marks from the captured image and controls a cutting position based on positions of the extracted marks in a printed material processing device such as a cutter which cuts printed materials.

Furthermore, an inspection device which inspects a printed material captures a predetermined pattern printed on the printed material by a color camera, extracts the pattern from a captured image, and compares the extracted pattern and the reference pattern.

To extract marks or patterns from a captured image, these devices need to extract pixels of specific colors from the image. This technique is known as an image processing device which extracts pixels of colors included in a color extraction range indicated in advance (see, for example, JP 2013-120550).

The above conventional image processing device converts RGB values in an RGB color space in an image into HSV values in an HSV color space, and extracts a pixel based on the HSV values. According to the HSV values, an H value represents a hue, an S value represents a chroma, and a V value represents a luminance. In this regard, according to a grayscale color, there is a case where the R value, the G value and the B value are equal, and there is also a case where the R value, the G value and the B value approximate to each other. When the R value, the G value and the B value approximate to each other, the H value can take a value from 0 of a minimum value to 360 of a maximum value according to the R value, the G value and the B value. Therefore, it is difficult to accurately extract the grayscale color based on the HSV values. Hence, processing precision based on an extracted pixel lowers in some cases.

SUMMARY

The present disclosure has been made in light of this situation. An object of the present disclosure is to provide a control device and an inspection device which can more accurately extract pixels of specific colors from a captured image of a printed material, and perform more precise processing based on the extracted pixel.

To solve the above problem, a control device according to one embodiment of the present disclosure is a control device that controls a printing press, and includes: a capturing unit that captures an inspection target object printed on a target printed material by the printing press, and outputs RGB values of each pixel of a captured image; a converter that specifies a pixel with respectively equal RGB values and a pixel with respectively approximating RGB values in the image captured by the capturing unit as pixels in a grayscale area, and converts the RGB values of each pixel other than the grayscale area into HSV values in an HSV color space; an extractor that extracts a pixel of an extraction target color from the image captured by the capturing unit based on the RGB values in a case of the pixel in the grayscale area, and based on the HSV values in a case of the pixel other than the grayscale area; and a controller that controls the printing press to correct a print misalignment based on the pixel of the extraction target color extracted by the extractor.

Another embodiment of the present disclosure is also a control device. This device is a control device that controls a printed material processing device to process a printed material, and includes: a capturing unit that captures an inspection target object printed on the printed material, and outputs RGB values of each pixel of a captured image; a converter that specifies a pixel with respectively equal RGB values and a pixel with respectively approximating RGB values in the image captured by the capturing unit as pixels in a grayscale area, and converts the RGB values of each pixel other than the grayscale area into HSV values in an HSV color space; an extractor that extracts a pixel of an extraction target color from the image captured by the capturing unit based on the RGB values in a case of the pixel in the grayscale area, and based on the HSV values in a case of the pixel other than the grayscale area; and a controller that controls the printed material processing device to adjust a processing position of the printed material based on the pixel of the extraction target color extracted by the extractor.

Still another embodiment of the present disclosure is an inspection device. This device is an inspection device that inspects a printed material, and includes: a capturing unit that captures an inspection target object printed on the printed material, and outputs RGB values of each pixel of a captured image; a converter that specifies a pixel with respectively equal RGB values and a pixel with respectively approximating RGB values in the image captured by the capturing unit as pixels in a grayscale area, and converts the RGB values of each pixel other than the grayscale area into HSV values in an HSV color space; an extractor that extracts a pixel of an extraction target color from the image captured by the capturing unit based on the RGB values in a case of the pixel in the grayscale area, and based on the HSV values in a case of the pixel other than the grayscale area; and a comparator that compares the image of the inspection target object and a reference image based on the pixel of the extraction target color extracted by the extractor.

In addition, an optional combination of the above components and any replacement of expressions of the present disclosure between methods, devices, systems, recording media and computer programs is also effective as embodiments of the present disclosure.

DETAILED DESCRIPTION

First Embodiment

Figure 1:
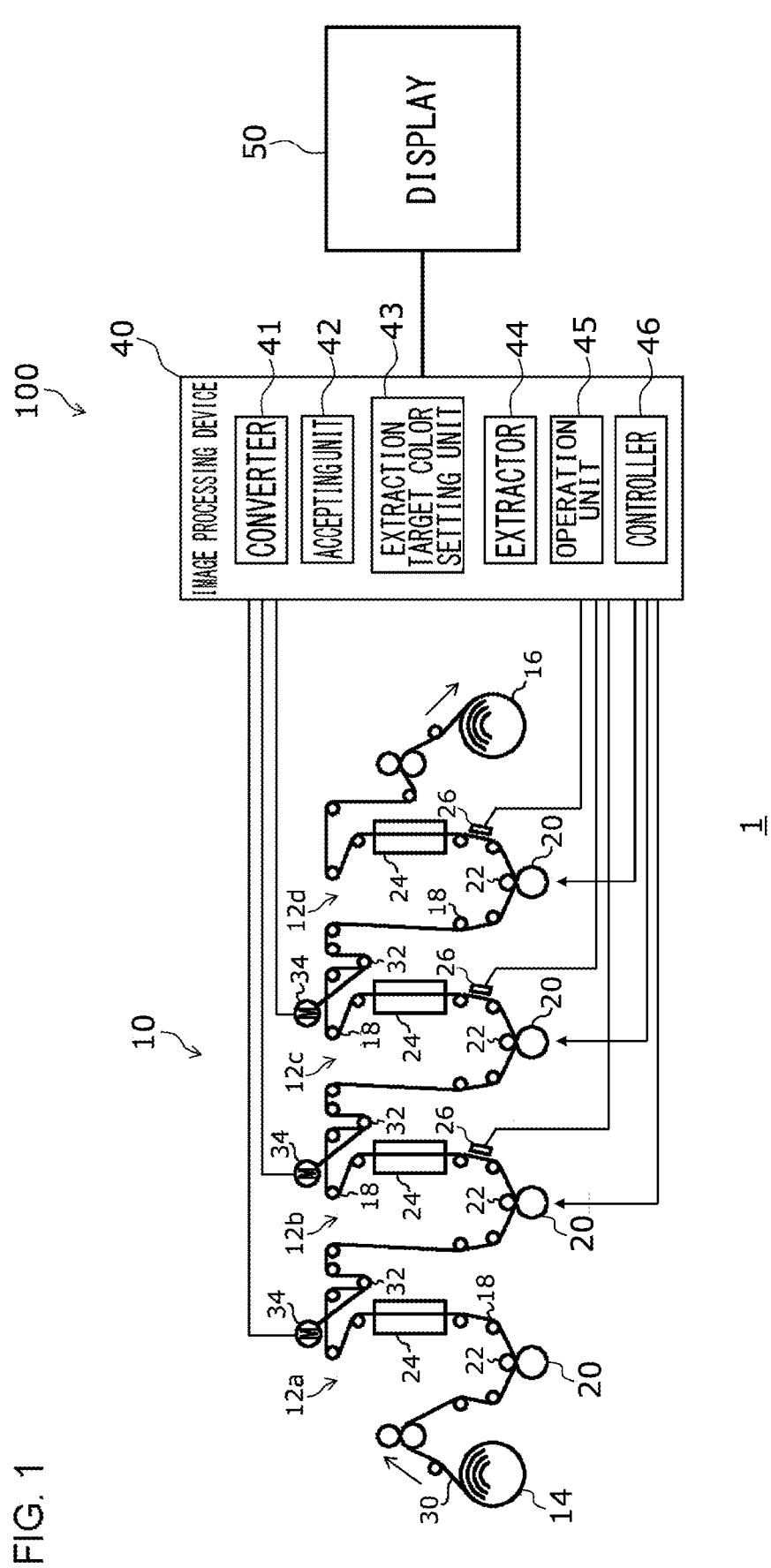
FIG. 1 is a view illustrating a print system according to a first embodiment.

FIG. 1 is a view illustrating a print system 1 according to the first embodiment. As illustrated in FIG. 1, the print system 1 includes a printing press 10 and a control device 100. The printing press 10 is a multicolor gravure rotary printing press which enables four-color printing on a web 30 which is a target printed material. The printing press 10 includes a first print unit 12a, a second print unit 12b, a third print unit 12c, a fourth print unit 12d, an unwinder 14, a winder 16, a plurality of compensator rollers 32 and a plurality of register motors 34.

The four first print unit 12a, second print unit 12b, third print unit 12c and fourth print unit 12d are disposed in series. In addition, the first print unit 12a, the second print unit 12b, the third print unit 12c and the fourth print unit 12d will be collectively referred to as a "print unit 12" as appropriate.

At an upstream of the first print unit 12a, the unwinder 14 which supplies the web 30 to be printed is installed. Furthermore, at a downstream of the fourth print unit 12d, the winder 16 which winds the printed web 30 is installed. Each print unit 12 is provided with a plurality of guide rollers 18, and has a convey path of the web 30 formed therein.

In each print unit 12, a plate cylinder 20 of a cylindrical shape which transfers an ink as a coating agent is attached to a lower side of each print unit 12 and an impression cylinder 22 of a cylindrical shape which pressurizes the web 30 is attached to an upper side of each print unit 12 while sandwiching the web 30 so as to be rotatable about a cylindrical axis. Furthermore, at a downstream of each plate cylinder 20, a drier 24 which blows air and dries a print face of the web 30 is disposed.

The control device 100 functions as a register error detection device, and controls the printing press 10.

The control device 100 includes three capturing units 26, an image processing device 40 and a display (monitor) 50.

The capturing unit 26 is disposed between the plate cylinder 20 and the drier 24 in each of the second print unit 12b, the third print unit 12c and the fourth print unit 12d. The capturing unit 26 is configured by using, for example, a Charge Coupled Device (CCD) or a Complementary Metal Oxide Semiconductor (CMOS) which receives light and converts the light into an electrical signal.

For example, the capturing unit 26 of the second print unit 12b captures a first register mark printed by the first print unit 12a at the upstream of the second print unit 12b, and a second register mark printed by the plate cylinder 20 of the second print unit 12b, and outputs RGB values of each pixel of a captured color image. The first register mark and the second register mark are marks for controlling a print misalignment of the printing press 10, and are inspection target objects. The capturing unit 26 is electrically connected with the image processing device 40. A region captured by the capturing unit 26 is illuminated by an unillustrated illumination device.

Figure 2:
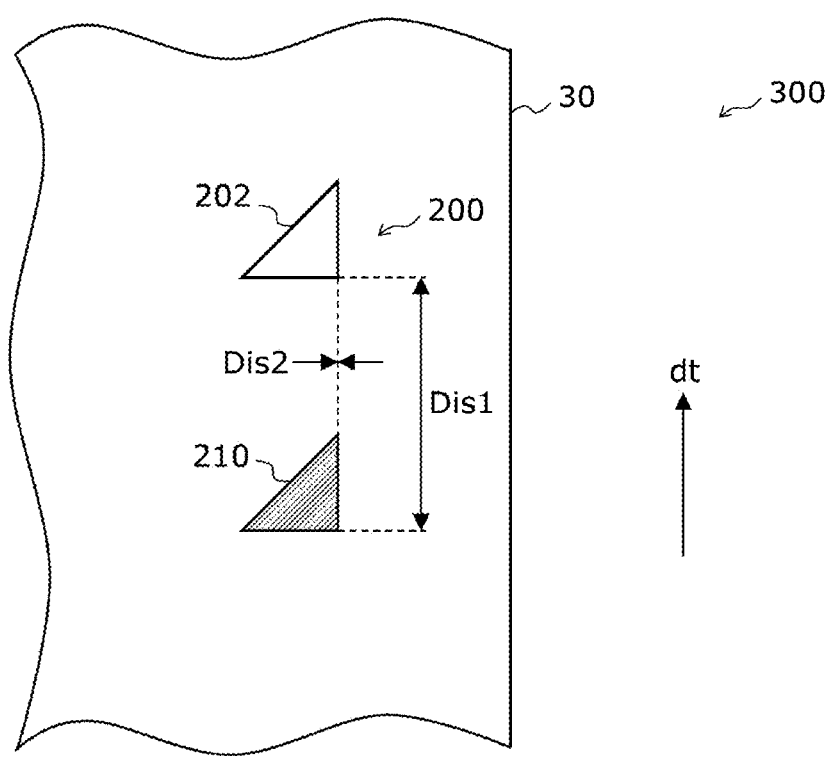
FIG. 2 is a view illustrating part of a printed material on which a register mark is printed according to the first embodiment.

FIG. 2 is a view illustrating part of a printed material 300 on which a register mark 200 has been printed according to the first embodiment. The printed material 300 includes a web 30, a first register mark 202 of a first color and a second register mark 210 of a second color different from the first color. The web 30 is formed by a film, paper or an aluminum. The color of the web 30 is a grayscale color in some cases, or a color other than the grayscale in some cases. Both of the first color and the second color are the grayscale colors in some cases or colors other than the grayscale in some cases. The first register mark 202 and the second register mark 210 will be collectively referred to as the register mark 200. Although not illustrated, a pattern of the first color and a pattern of the second color are printed in a region other than a region of the web 30 in which the register mark 200 is printed.

The first register mark 202 is printed on the web 30 by the plate cylinder (first plate cylinder) 20 of the first print unit 12a of the printing press 10. The second register mark 210 is printed on the web 30 by the plate cylinder (second plate cylinder) 20 of the second print unit 12b of the printing press 10. Although the first register mark 202 and the second register mark 210 are both equal isosceles right triangles, the shapes thereof are not limited in particular. Although the first register mark 202 and the second register mark 210 are disposed along a conveying direction dt of the web 30 in the printing press 10, the arrangement thereof is not limited in particular.

A distance between two sides orthogonal to the conveying direction dt of the first register mark 202 and the second register mark 210 is a distance Dis1. A distance in a direction (referred to as a horizontal direction) orthogonal to the conveying direction dt between extension lines of the two sides along the conveying direction dt of the first register mark 202 and the second register mark 210 is a distance Dis2. When there is no print misalignment, the first register mark 202 and the second register mark 210 are arranged such that the distance Dis1 matches with a reference distance and the distance Dis2 is zero. When there is a print misalignment in a vertical direction, the distance Dis1 does not match with the reference distance. When there is a print misalignment in the horizontal direction, the distance Dis2 does not become zero.

Figure 3:
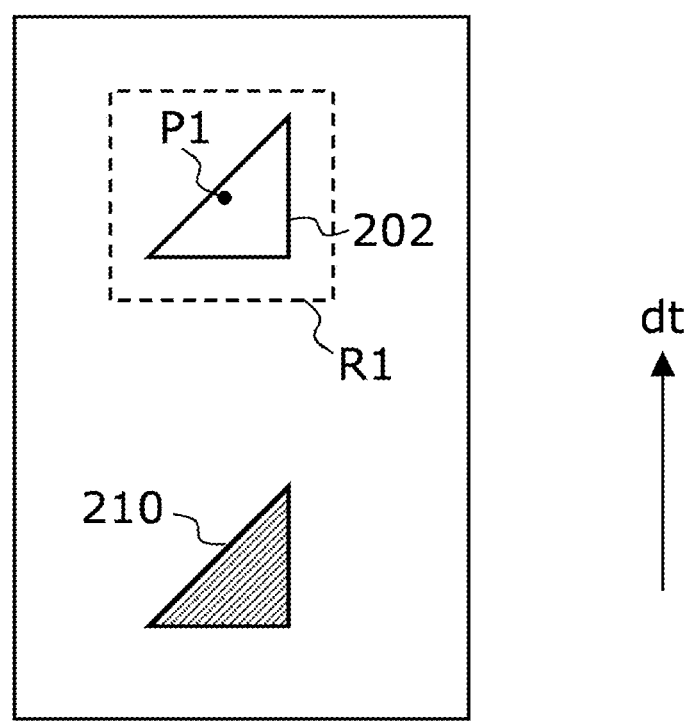
FIG. 3 is a view illustrating an image of a register mark captured by a capturing unit in FIG. 1.

FIG. 3 is a view illustrating an image of the register mark 200 captured by the capturing unit 26 in FIG. 1. The image includes the first register mark 202 and the second register mark 210.

Back to FIG. 1, the display 50 is connected with the image processing device 40, and displays the image captured by the capturing unit 26. A user can visually check a situation of misregister by monitoring the display 50.

The image processing device 40 includes a converter 41, an accepting unit 42, an extraction target color setting unit 43, an extractor 44, an operation unit 45 and a controller 46.

The converter 41 specifies pixels with respectively equal RGB values and pixels with respectively approximating RGB values as pixels in the grayscale area in the image captured by the capturing unit 26, and converts the RGB values of each pixel other than the grayscale area into HSV values in an HSV color space. The pixel with the respectively equal RGB values refers to a pixel of the grayscale color. The pixel with the respectively approximating RGB values is a pixel whose color can be regarded as the same as a color of a pixel with the respectively equal RGB values. A specific range of the RGB values of the pixel with the respectively approximating RGB values can be optionally set by an experiment. The RGB values can be converted into the HSV values by using a known technique.

When, for example, the first color of the first register mark 202 in FIG. 3 is red, the second color of the second register mark 210 is black and the color of the web 30 is gray, the pixels of the second register mark 210 and the web 30 are specified as pixels in the grayscale area. The pixels of the first register mark 202 are pixels other than the grayscale area.

When an initial setting needs to be made, such as a start of printing, and the setting needs to be changed, the accepting unit 42 accepts an indication of one or a plurality of extraction target pixels in the image displayed on the display 50. The extraction target pixels are indicated by, for example, the user. The extraction target pixels are the pixels of the first register mark 202 and the pixels of the second register mark 210. A method of indicating the extraction target pixels is not limited in particular. However, when, for example, the user indicates one point P1 of the image displayed on the display 50 as illustrated in FIG. 3, a rectangular region R1 of a predetermined size with the indicated one point P1 as a center may be set, and a plurality of pixels in a triangle which represents the first register mark 202 in the region R1 may be indicated as the extraction target pixels. In this case, a method of recognizing the pixels in the triangle of the region R1 is not limited in particular. However, as described below, the fact that the number of pixels in the triangle is a predetermined rate of the number of pixels of the region R1 can be used.

When the pixels in the region R1 are the pixels in the grayscale area, i.e., when two colors in the region R1 are the grayscale, a pixel number distribution per R value of the pixels in the region R1 has two peaks associated with the two colors. The peak having the number of pixels of a predetermined rate of the number of pixels in the region R1 among the two peaks corresponds to the pixel in the triangle. The same applies to a pixel number distribution per G value of the pixels in the region R1, and a pixel number distribution per B value of the pixels in the region R1. In this case, the extraction target color setting unit 43 divides each of the RGB values of the pixels in the region R1 into two, and specifies the RGB values of the extraction target pixels.

When the pixels in the region R1 are the pixels other than the grayscale area, i.e., when the two colors in the region R1 are other than the grayscale, the pixel number distribution per H value of the pixels in the region R1 has two peaks associated with the two colors. The peak having the number of pixels of a predetermined rate of the number of pixels in the region R1 among the two peaks corresponds to the pixel in the triangle. In this case, the extraction target color setting unit 43 divides the H values of the pixels in the region R1, and specifies the H values of the extraction target pixels.

When the pixels in the region R1 are the pixels in the grayscale area and the pixels other than the grayscale area, i.e., when the two colors in the region R1 are the grayscale and other than the grayscale, each of the pixel number distribution per R value, the pixel number distribution per G value and the pixel number distribution per B value of the pixels in the region R1, and the pixel number distribution per H value of the pixels in the region R1 has one peak. The peak having the number of pixels of a predetermined rate of the number of pixels of the region R1 corresponds to a pixel in the triangle. In this case, the extraction target color setting unit 43 specifies the RGB values of the pixels in the region R as the RGB values of the extraction target pixels or specifies the H values of the pixels in the region R1 as the H values of the extraction target pixels.

When the extraction target pixels are the pixels in the grayscale area, the extraction target color setting unit 43 sets the range of the RGB values of the extraction target color to include the RGB values of the extraction target pixels. The extraction target color setting unit 43 adds a predetermined margin to the RGB values of the extraction target pixels to set the range of the RGB values of the extraction target color.

When the extraction target pixels are the pixels other than the grayscale area, the extraction target color setting unit 43 sets the range of the HSV values of the extraction target color to include the HSV values of the extraction target pixels. The extraction target color setting unit 43 adds a predetermined margin to the HSV values of the extraction target pixels to set the range of the HSV values of the extraction target color.

In this regard, when a luminance of the illumination fluctuates, the RGB values and the HSV values of the captured image change. Furthermore, the web 30 flaps due to air blown by the drier 24 in some cases. When the web 30 flaps, how light is shed by the illumination device changes, and therefore the RGB values and the HSV values of the captured image change. Hence, each margin is set to include fluctuations of the RGB values and the HSV values in a case where illumination environment changes and when a web flaps, and an optimal value of each margin can be optionally set by an experiment.

How the light is shed by the illumination device changes in this way, so that the RGB values or the HSV values change even in the register mark printed with an identical color. Therefore, it is preferable that more pixels in the register mark of the identical color are included as the extraction target pixels. Consequently, it is possible to extract the entire register mark.

Furthermore, the extraction target color setting unit 43 extracts the edge from the image captured by the capturing unit 26, and excludes a pixel of the edge from the extraction target pixels to set the range of the RGB values of the extraction target color and the range of the HSV values of the extraction target color. As a technique of extracting the edge, a known technique can be used.

Figure 4:
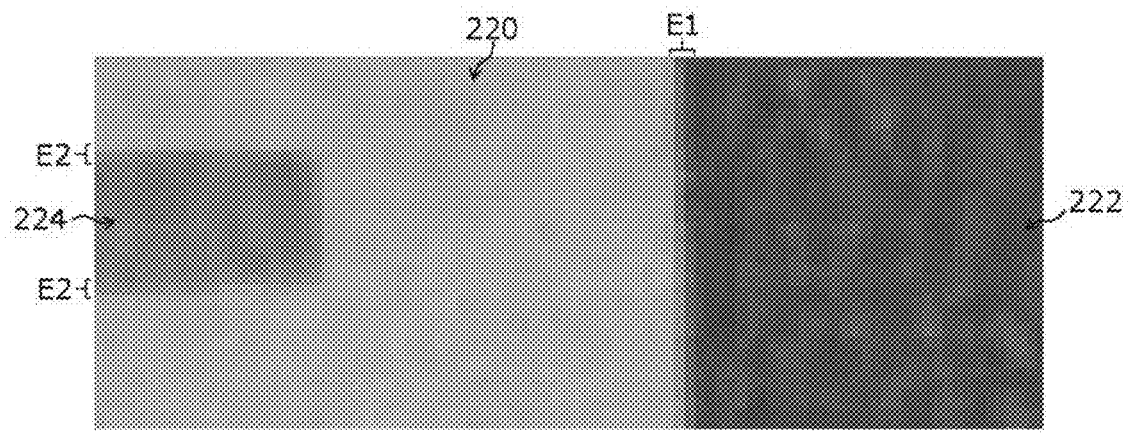
FIG. 4 is a view illustrating one example of the image captured by the capturing unit in FIG. 1.

FIG. 4 is a view illustrating one example of an image captured by the capturing unit 26 in FIG. 1. For convenience of description, the image in FIG. 4 is different from the image in FIG. 3. The image in FIG. 4 includes a background part 220, a pattern part 222 and a pattern part 224. Due to a finite number of pixels of the image to be captured, and an ink transferred in a dot pattern by gravure printing, colors of the background part 220 are mixed at an edge E1 of the pattern part 222 and an edge E2 of a pattern part 224.

Figure 5:
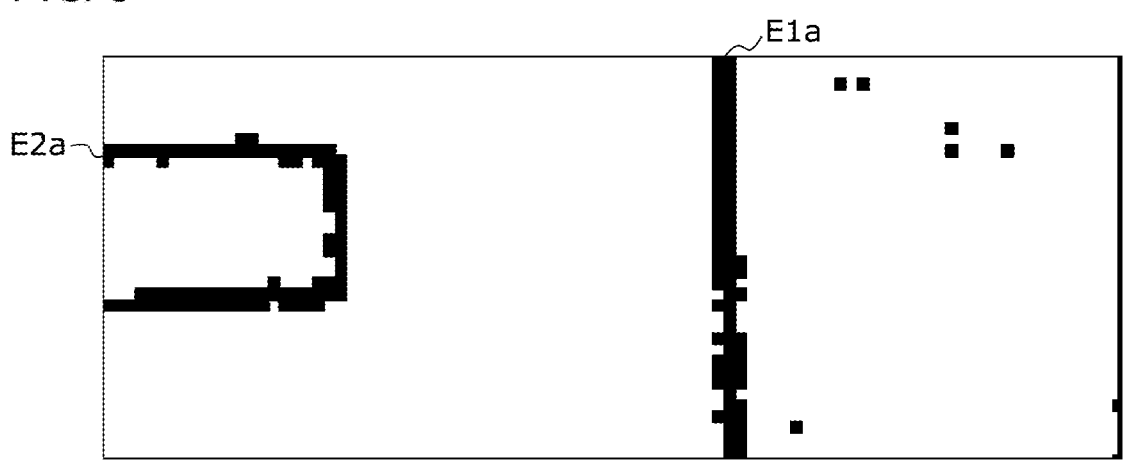
FIG. 5 is a view illustrating an edge extracted from the image in FIG. 4.

FIG. 5 is a view illustrating an edge E1a and an edge E2a extracted from the image in FIG. 4. These edges are removed, and the range of the RGB values of the extraction target color and the range of the HSV values of the extraction target color are set, so that it is possible to prevent an uncertain color from being included as the extraction target color.

In each of the cases when the pixels of the first register mark 202 are indicated as the extraction target pixels, and when the pixels of the second register mark 210 are indicated as the extraction target pixels, the extraction target color setting unit 43 sets the range of the extraction target color. The extraction target color setting unit 43 stores the set range of the RGB values of the extraction target color, and the set range of the HSV values of the extraction target color.

Back to FIG. 1, the extractor 44 extracts the pixels of the extraction target color from the image captured by the capturing unit 26 based on the RGB values in a case of the pixels in the grayscale area and based on the HSV values in a case of the pixels other than the grayscale area. More specifically, when the RGB values of the pixels in the grayscale area are included in the range of the RGB values of the extraction target color, the extractor 44 extracts the pixels as the pixels of the extraction target color. When the HSV values of the pixels other than the grayscale area are included in the range of the HSV values of the extraction target color, the extractor 44 extracts the pixels as the pixels of the extraction target color.

Furthermore, when there is at least one pixel of a different color from the extraction target color around the pixels of the extraction target color, the extractor 44 extracts the pixel of the different color from the extraction target color around the pixels of the extraction target color as the pixel of the extraction target color (expansion processing). Furthermore, when there is at least one pixel of a different color from the extraction target color around the pixels of the extraction target color, the extractor 44 does not extract the pixels of the extraction target color adjacent to the pixel of the different color from the extraction target color as the pixel of the extraction target color (reduction processing). That is, the extractor 44 performs expansion processing and reduction processing on the pixels of the extraction target color. In this case, the extractor 44 does not change the range of the RGB values of the extraction target color and the range of the HSV values of the extraction target color.

Figure 6:
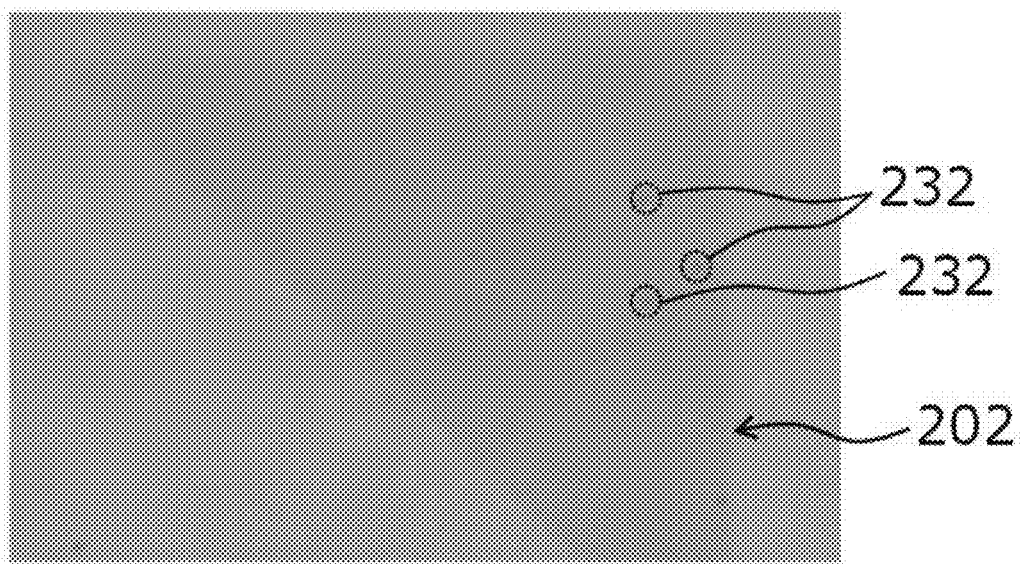
FIG. 6 is a view illustrating an image of a first register mark captured by the capturing unit in FIG. 1.

FIG. 6 is a view illustrating an image of the first register mark 202 captured by the capturing unit 26 in FIG. 1. For convenience of description, the image in FIG. 6 differs in a direction from that of the image in FIG. 3. The register mark 200 is likely to become faint or include foreign materials. In FIG. 6, the first register mark 202 includes a plurality of foreign materials 232. Colors of the foreign materials 232 are different from the color of the first register mark 202.

Figure 7:
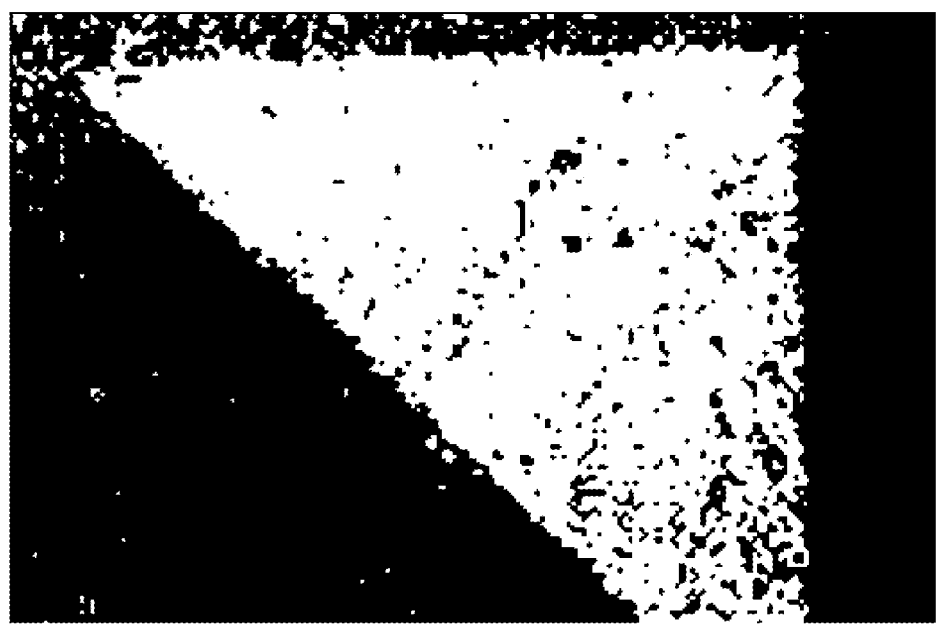
FIG. 7 is a view illustrating pixels of an extraction target color extracted from the image in FIG. 6 according to a comparative example.

FIG. 7 is a view illustrating pixels of an extraction target color extracted from the image in FIG. 6 according to a comparative example. In FIG. 7, the pixels of the extraction target color are displayed white, and pixels of different colors from the extraction target color are displayed black.

According to the comparative example, in addition to the color of the first register mark 202, the colors of the foreign materials 232 are also set to the extraction target color. Hence, pixels of part of a background part outside the first register mark 202 are extracted as pixels of the extraction target color. Hence, according to the comparative example, it is difficult to accurately extract only the first register mark 202.

Figure 8:
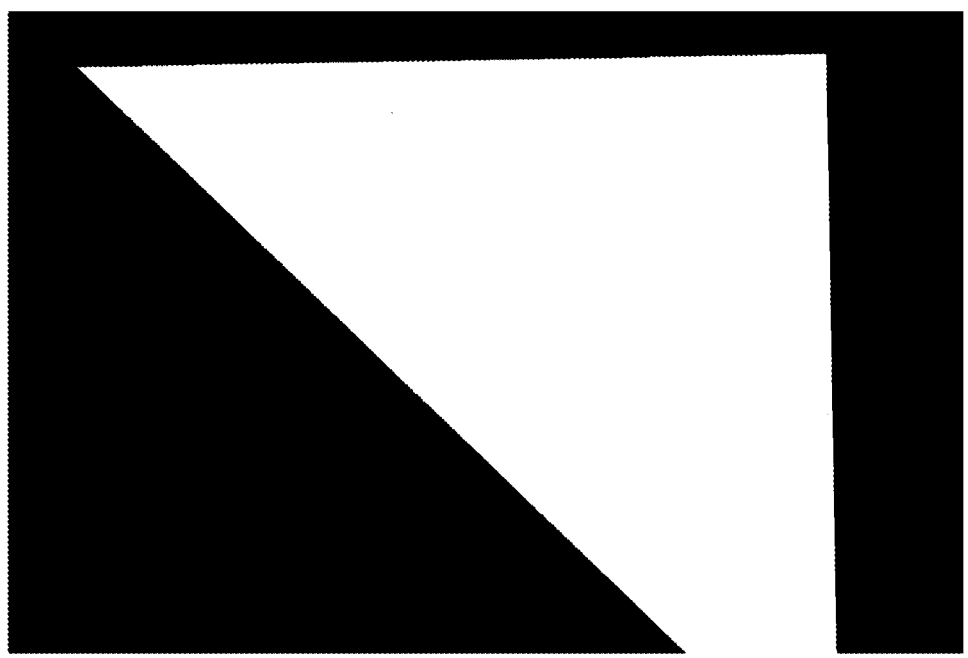
FIG. 8 is a view schematically illustrating the pixels of the extraction target color extracted from the image in FIG. 6 according to the first embodiment.

FIG. 8 is a view schematically illustrating the pixels of the extraction target color extracted from the image in FIG. 6 according to the first embodiment. By performing the expansion processing and the reduction processing without changing the range of the RGB values of the extraction target color and the range of the HSV values of the extraction target color, it is possible to accurately extract the pixels of the first register mark 202 as the pixels of the extraction target color as illustrated in FIG. 8, and the pixels of the background part are not extracted.

Back to FIG. 1, the operation unit 45 computes a misalignment amount of the first register mark 202 and the second register mark 210 in the image as a register error based on the pixels of the extraction target color extracted by the extractor 44. The operation unit 45 can compute a vertical direction register error which is misregister in a conveying direction d1 of the web 30, and a horizontal direction register error which is misregister in the horizontal direction. The vertical direction register error is a difference between the distance Dis1 and the reference distance. The horizontal direction register error is the distance Dis2.

Similarly, the capturing unit 26 of each of the third print unit 12c and the fourth print unit 12d also captures the first register mark printed by the print unit 12 at the upstream of each of the third print unit 12c and the fourth print unit 12d, and the second register mark printed by the plate cylinder 20 of each of the third print unit 12c and the fourth print unit 12d. The operation unit 45 computes a register error of the first register mark and the second register mark based on the image captured by the capturing unit 26 for each of the third print unit 12c and the fourth print unit 12d.

The controller 46 controls the printing press 10 to correct the print misalignment based on the pixels of the extraction target color extracted by the extractor 44. More specifically, the controller 46 controls the printing press 10 to reduce the register error computed by the operation unit 45.

A compensator roller 32 which adjusts a supply phase of the web 30 is disposed each between the first print unit 12a and the second print unit 12b, between the second print unit 12b and the third print unit 12c and between the third print unit 12c and the fourth print unit 12d. This compensator roller 32 is driven by the register motor 34. Each register motor 34 is electrically connected with the image processing device 40, and moves the compensator roller 32 up and down according to an instruction from the controller 46 of the image processing device 40 to reduce the vertical direction register error. Consequently, it is possible to correct a print misalignment in the vertical direction in each print unit 12.

Furthermore, the plate cylinder 20 of each of the second print unit 12b, the third print unit 12c and the fourth print unit 12d moves in the horizontal direction according to the instruction from the controller 46 of the image processing device 40 to reduce the horizontal direction register error. Consequently, it is possible to correct a print misalignment in the horizontal direction in each print unit 12.

Capturing, computation of the register error and correction of the print misalignment described above are performed every time a pair of the first register mark 202 and the second register mark 210 are printed, and the print misalignment is corrected in real time during printing.

The image processing device 40 includes a computer, and various functions of the image processing device 40 can be configured by a circuit block, a memory or other LSIs in terms of hardware, and are realized by programs loaded to the memory in terms of software. Hence, one of ordinary skill in the art understands that the various functions of the image processing device 40 can be realized in various forms such as only hardware, only software or a combination of these, and the various functions are not limited to one.

Next, an entire operation of the control device 100 will be described. Hereinafter, an operation in a case where setting the range of the RGB values of the extraction target color and the range of the HSV values of the extraction target color has been finished will be described.

Figure 9:
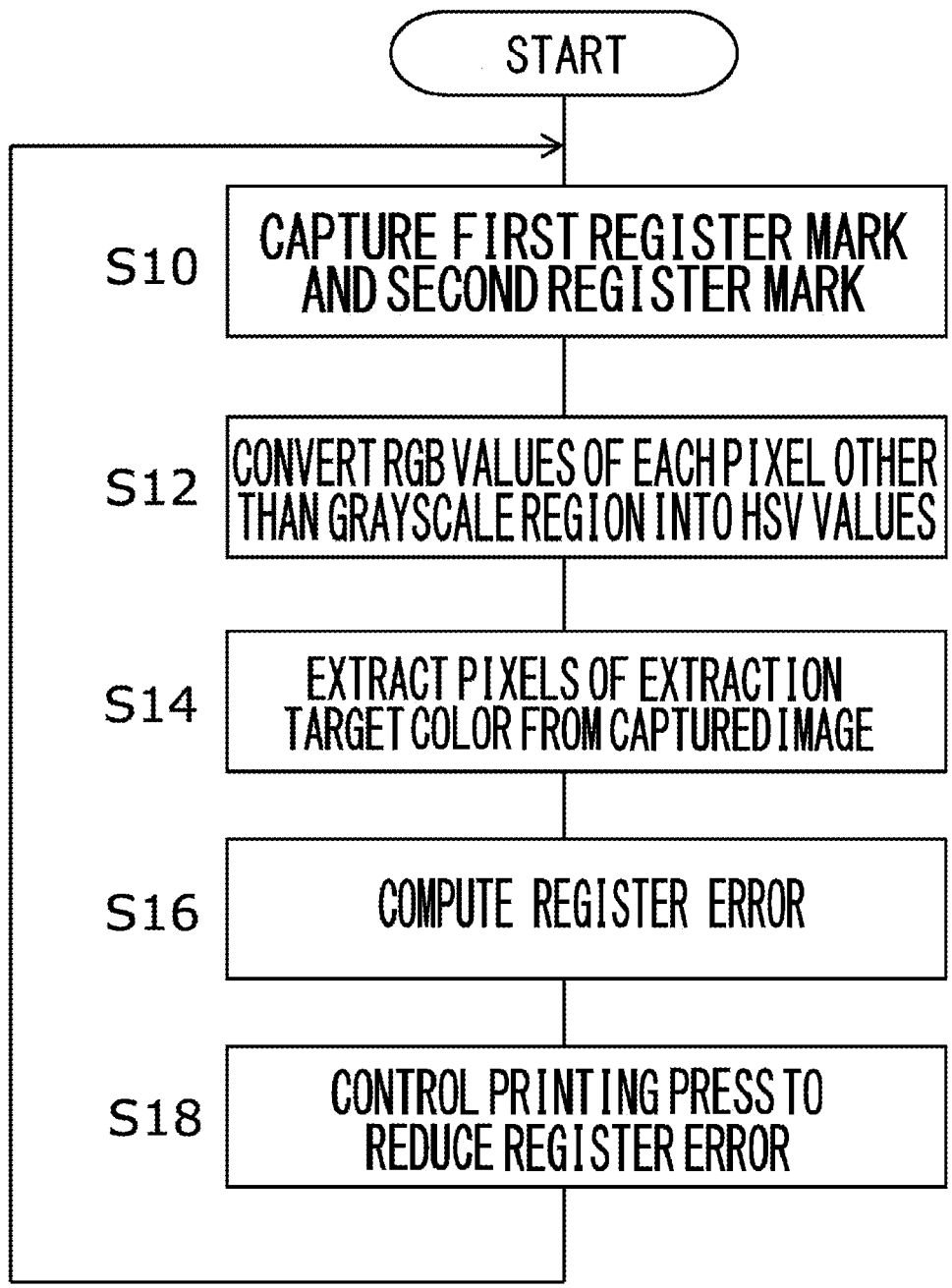
FIG. 9 is a flowchart illustrating processing of a control device in FIG. 1.

FIG. 9 is a flowchart illustrating processing of the control device 100 in FIG. 1. First, the capturing unit 26 captures the first register mark and the second register mark (S10). Next, the converter 41 converts the RGB values of each pixel other than the grayscale area into the HSV values in the image captured in S10 (S12). Next, the extractor 44 extracts the pixels of the extraction target color from the image captured in S10 based on the RGB values in the case of the pixels in the grayscale area and based on the HSV values in the case of the pixels other than the grayscale area (S14). Next, the operation unit 45 computes the register error based on the pixels of the extraction target color extracted in S14 (S16). Next, the controller 46 controls the printing press 10 to reduce the register error computed in S16 (S18), and processing returns to S10.

As described above, according to the present embodiment, in the case of the pixels in the grayscale area, the pixels of the extraction target color are extracted from the captured image based on the RGB values, so that it is possible to appropriately extract the pixels of the extraction target color of the grayscale. Consequently, it is possible to appropriately extract the register mark 200 of the grayscale color.

Furthermore, in the case of the pixels other than the grayscale area, the pixels of the extraction target color are extracted from the captured image based on the HSV values. Even when a color other than the grayscale brightens or darkens due to how light is shed, the H value hardly changes, and the V value changes, so that it is possible to appropriately extract the pixels of the extraction target color other than the grayscale. Consequently, it is possible to appropriately extract the register mark 200 of the color other than the grayscale. Furthermore, a part other than the register mark 200 is hardly extracted.

Furthermore, the pixel of the edge is excluded from the extraction target pixels, and the range of the RGB values of the extraction target color and the range of the HSV values of the extraction target color are set, so that it is possible to prevent an uncertain color included in the edge from being included in the extraction target color. Consequently, it is possible to prevent a part other than the register mark 200 from being erroneously detected.

Furthermore, the predetermined margin is added to the RGB values of the extraction target pixels to set the range of the RGB values of the extraction target color, and the predetermined margin is added to the HSV values of the extraction target pixels to set the range of the HSV values of extraction target color. Consequently, when the illumination environment changes and when the web 30 flaps, it is possible to more accurately detect the register mark 200.

Furthermore, without changing the range of the RGB values of the extraction target color and the range of the HSV values of the extraction target color, expansion processing and reduction processing are performed on the image captured by the capturing unit 26. Consequently, it is possible to more accurately detect the register mark 200, and prevent pixels which exist other than around the pixels of the extraction target color and have a different color from the extraction target color from being erroneously extracted as pixels of the extraction target color.

Consequently, it is possible to more accurately extract pixels of a specific color from a captured image of the printed material 300, and perform more precisely processing based on the extracted image. That is, it is possible to more precisely correct a print misalignment.

Furthermore, the extraction target pixels are indicated by using a color image displayed on the display 50, so that it is possible for the user not to make a mistake between the first register mark 202 and the second register mark 210.

Second Embodiment

The second embodiment differs from the first embodiment in controlling a printed material processing device based on an image processing technique according to the first embodiment. Differences from the first embodiment will be mainly described below.

Figure 10:
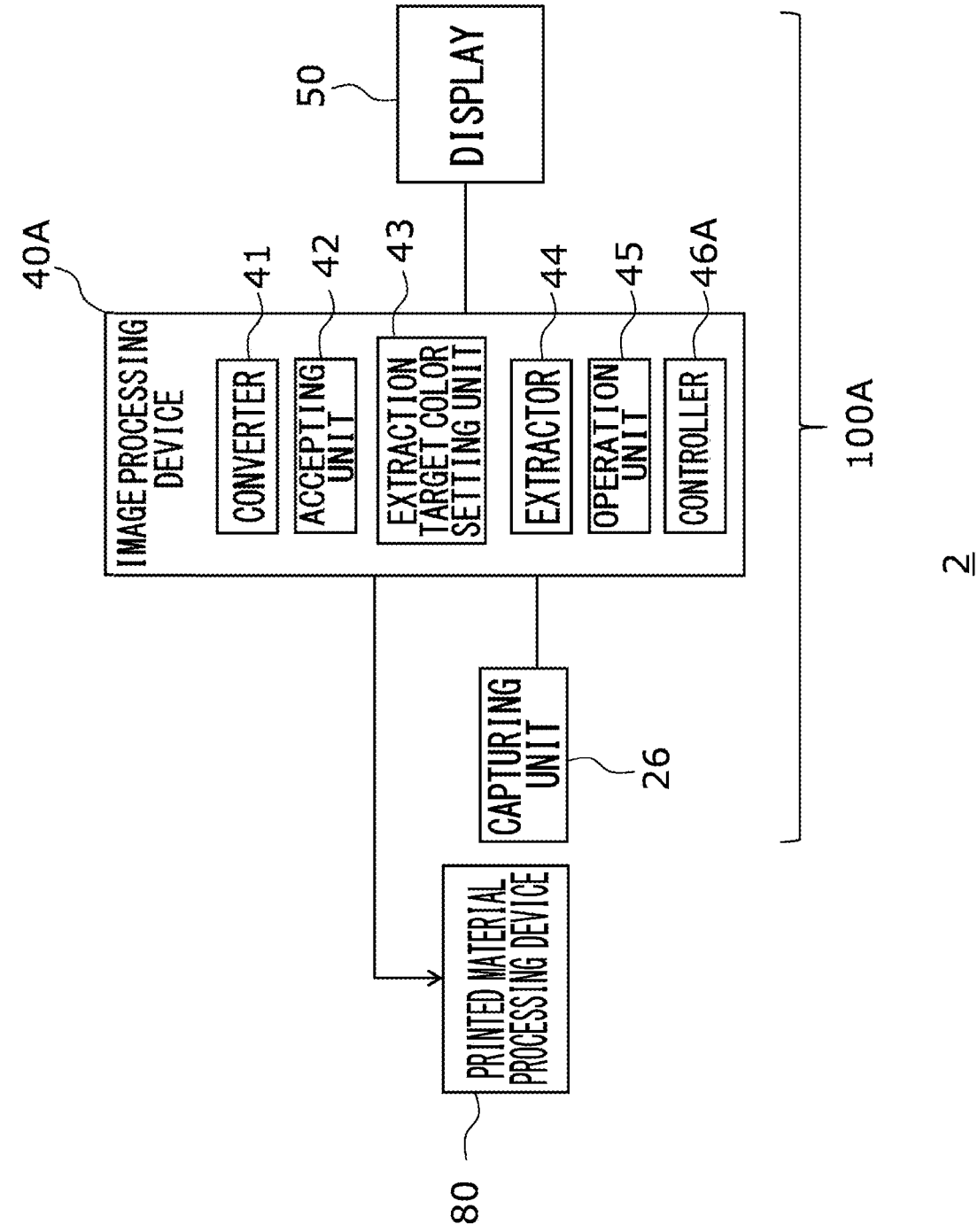
FIG. 10 is a view illustrating a printed material processing system according to a second embodiment.

FIG. 10 is a view illustrating a printed material processing system 2 according to the second embodiment. As illustrated in FIG. 10, the printed material processing system 2 includes a printed material processing device 80 and a control device 100A. The printed material processing device 80 processes a printed material. The printed material processing device 80 is, for example, a cutter which cuts the printed material.

The control device 100A controls the printed material processing device 80. A capturing unit 26 of the control device 100A captures a cut mark or a slitter mark as an inspection target object printed on the printed material. In an image processing device 40A of the control device 100A, a controller 46A controls the printed material processing device 80 to adjust a processing position, i.e., a cutting position of the printed material based on an image of the inspection target object including pixels of an extraction target color extracted by an extractor 44.

According to the present embodiment, it is possible to more accurately extract pixels of specific colors from the captured image of the printed material, and perform more precise processing based on the extracted pixels. That is, it is possible to more precisely control the processing position.

In addition, the printed material processing device 80 may be a puncher which makes holes in a printed material. In this case, an inspection target object printed on the printed material is a cut mark and a register mark, and a processing position of the printed material is a hole position.

Third Embodiment

The third embodiment differs from the first embodiment in inspecting a printed material based on an image processing technique according to the first embodiment. Differences from the first embodiment will be mainly described below.

Figure 11:
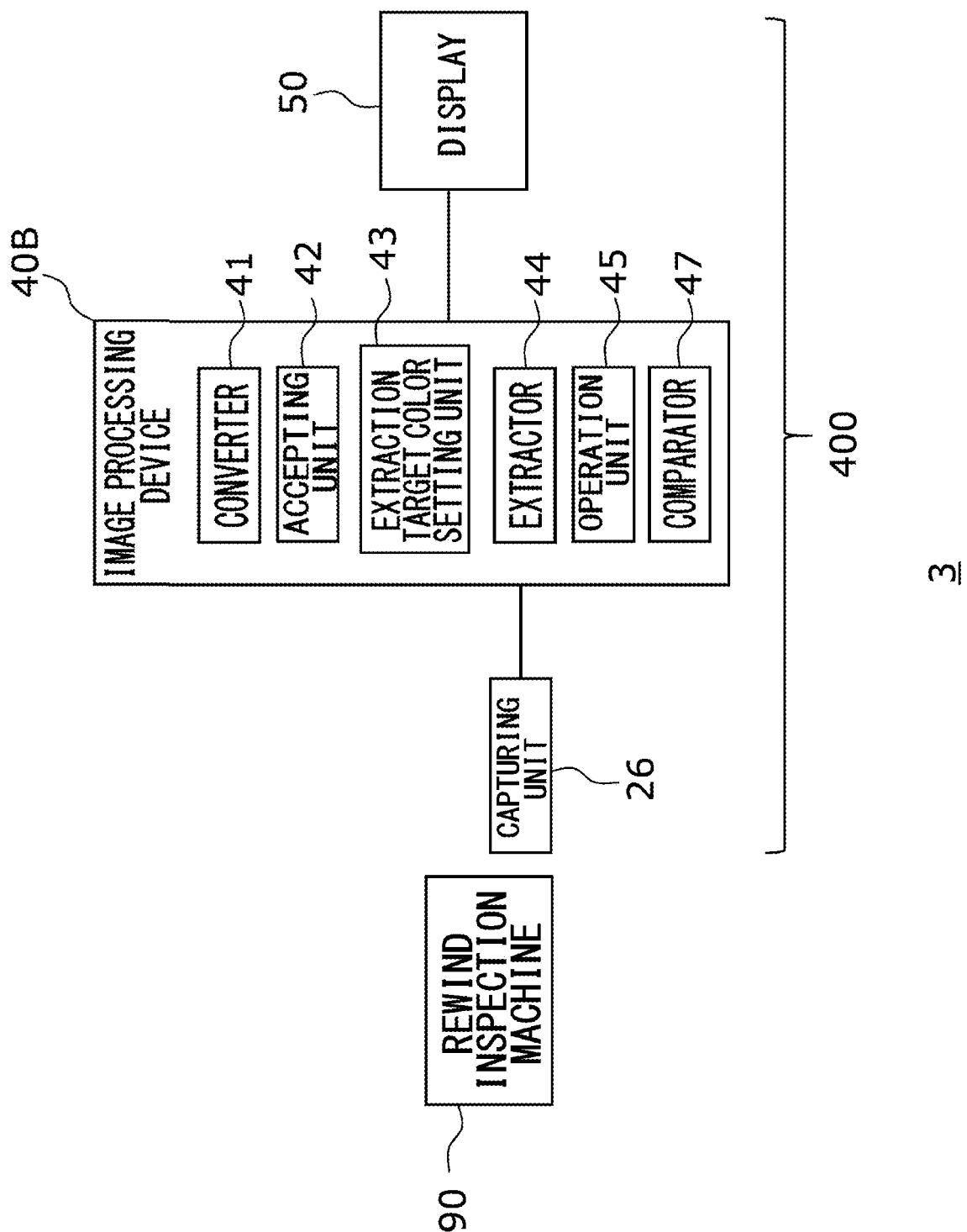
FIG. 11 is a view illustrating an inspection system according to a third embodiment.

FIG. 11 is a view illustrating an inspection system 3 according to the third embodiment. As illustrated in FIG. 11, the inspection system 3 includes a rewind inspection machine 90 and an inspection device 400. The rewind inspection machine 90 rewinds a roll-shaped printed material. The inspection device 400 is attached to the rewind inspection machine 90 and inspects the printed material. The inspection device 400 includes a capturing unit 26, an image processing device 40B and a display 50. The capturing unit 26 captures a pattern as the inspection target object printed on the printed material.

The image processing device 40B differs from the first embodiment in including a comparator 47 in place of a controller 46. The comparator 47 compares the image of the inspection target object formed by extracted pixels of an extraction target color, and a reference image stored in advance, based on the pixels of the extraction target color extracted by an extractor 44. When the image of the inspection target object and the reference image mismatch, the comparator 47 notifies an outside of the mismatch. Consequently, it is possible to use the inspection device as one means for checking defective products.

According to the present embodiment, it is possible to more accurately extract pixels of specific colors from the captured image of the printed material, and perform more precise processing based on the extracted pixels. That is, it is possible to more precisely inspect the inspection target object.

In addition, in place of the rewind inspection machine 90, a laminator machine which deposits two sheets of printed webs may be used. In this case, too, the inspection device can be used as one means for checking defective products.

The present disclosure has been described above based on the embodiments. One of ordinary skill in the art understands that the embodiments are exemplary, various modified examples of combinations of each of these components and each processing process are possible, and these modified examples are also within the scope of the present disclosure.

For example, the first embodiment has described one example where a printing press 10 controlled by a control device 100 is a rotary printing press for gravure printing, yet is not limited to this. The printing press 10 may be, for example, a rotary printing press for offset printing or a flexography. Furthermore, the printing press 10 is not limited to four-color printing as long as the printing press 10 is a multicolor rotary printing press. Furthermore, the printing press 10 is a sheet-fed printing press.

Furthermore, according to the first embodiment, an operation unit 45 may compute a register error based on a gravitational position of a first register mark 202 and a gravitational position of a second register mark 210 obtained by known image processing.

What is claimed is:

1. A control device that controls a printing press comprising:
   a capturing unit that captures an inspection target object printed on a target printed material by the printing press, and outputs RGB values of each pixel of a captured image;
   a converter that specifies a pixel with respectively equal RGB values and a pixel with respectively approximating RGB values in the image captured by the capturing unit as pixels in a grayscale area, and converts the RGB values of each pixel other than the grayscale area into HSV values in an HSV color space;
   an extractor that extracts a pixel of an extraction target color from the image captured by the capturing unit based on the RGB values in a case of the pixel in the grayscale area, and based on the HSV values in a case of the pixel other than the grayscale area; and
   a controller that controls the printing press to correct a print misalignment based on the pixel of the extraction target color extracted by the extractor.

2. The control device according to claim 1, further comprising:
   a display that displays the image captured by the capturing unit;
   an accepting unit that accepts an indication of an extraction target pixel in the image displayed by the display; and
   an extraction target color setting unit that, when the extraction target pixel is the pixel in the grayscale area, sets a range of RGB values of the extraction target color to include the RGB values of the extraction target pixel, and, when the extraction target pixel is the pixel other than the grayscale area, sets a range of HSV values of the extraction target color to include the HSV values of the extraction target pixel,
   wherein
   when the RGB values of the pixel in the grayscale area are included in the range of the RGB values of the extraction target color, the extractor extracts the pixel as the pixel of the extraction target color, and
   when the HSV values of the pixel other than the grayscale area are included in the range of the HSV value of the extraction target color, the extractor extracts the pixel as the pixel of the extraction target color.

3. The control device according to claim 2, wherein
   the accepting unit accepts an indication of a plurality of the extraction target pixels, and
   the extraction target color setting unit extracts an edge from the image captured by the capturing unit, and excludes a pixel of the edge from the extraction target pixel to set the range of the RGB values of the extraction target color and the range of the HSV values of the extraction target color.

4. The control device according to claim 2, wherein the extraction target color setting unit
   adds a predetermined margin to the RGB values of the extraction target pixel to set the range of the RGB values of the extraction target color, and
   adds a predetermined margin to the HSV values of the extraction target pixel to set the range of the HSV values of the extraction target color.

5. The control device according to claim 2, wherein the extractor performs expansion processing and reduction processing on the image captured by the capturing unit without changing the range of the RGB values of the extraction target color and the range of the HSV values of the extraction target color.

6. The control device according to claim 1, wherein
   the printing press is a rotary printing press,
   the inspection target object includes a first register mark of a first color and a second register mark of a second color, the first register mark being printed on the target printed material by a first plate cylinder of the rotary printing press, and the second register mark being printed on the printed material by a second plate cylinder of the rotary printing press,
   the extraction target color includes the first color and the second color,
   the control device further comprises an operation unit that computes a misalignment amount of the first register mark and the second register mark in the image as a register error based on the pixel of the extraction target color extracted by the extractor, and
   the controller that controls the printing press to reduce the register error.

7. A control device that controls a printed material processing device to process a printed material, the control device comprising:
- a capturing unit that captures an inspection target object printed on the printed material, and outputs RGB values of each pixel of a captured image;
- a converter that specifies a pixel with respectively equal RGB values and a pixel with respectively approximating RGB values in the image captured by the capturing unit as pixels in a grayscale area, and converts the RGB values of each pixel other than the grayscale area into HSV values in an HSV color space;
- an extractor that extracts a pixel of an extraction target color from the image captured by the capturing unit based on the RGB values in a case of the pixel in the grayscale area, and based on the HSV values in a case of the pixel other than the grayscale area; and
- a controller that controls the printed material processing device to adjust a processing position of the printed material based on the pixel of the extraction target color extracted by the extractor.

8. An inspection device that inspect a printed material comprising:
- a capturing unit that captures an inspection target object printed on the printed material, and outputs RGB values of each pixel of a captured image;
- a converter that specifies a pixel with respectively equal RGB values and a pixel with respectively approximating RGB values in the image captured by the capturing unit as pixels in a grayscale area, and converts the RGB values of each pixel other than the grayscale area into HSV values in an HSV color space;
- an extractor that extracts a pixel of an extraction target color from the image captured by the capturing unit based on the RGB values in a case of the pixel in the grayscale area, and based on the HSV values in a case of the pixel other than the grayscale area; and
- a comparator that compares the image of the inspection target object and a reference image based on the pixel of the extraction target color extracted by the extractor.

* * * * *